US010019989B2

(12) United States Patent
Gauci

(10) Patent No.: US 10,019,989 B2
(45) Date of Patent: *Jul. 10, 2018

(54) TEXT TRANSCRIPT GENERATION FROM A COMMUNICATION SESSION

(71) Applicant: Google Inc., Mountain View, CA (US)

(72) Inventor: Jason John Gauci, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/262,284

(22) Filed: Sep. 12, 2016

(65) Prior Publication Data

US 2017/0011740 A1 Jan. 12, 2017

Related U.S. Application Data

(63) Continuation of application No. 13/599,908, filed on Aug. 30, 2012, now Pat. No. 9,443,518.

(Continued)

(51) Int. Cl.
*G10L 15/26* (2006.01)
*G06F 17/30* (2006.01)
(Continued)

(52) U.S. Cl.
CPC .......... *G10L 15/08* (2013.01); *G06F 17/2235* (2013.01); *G06F 17/241* (2013.01);
(Continued)

(58) Field of Classification Search
CPC ......... G10L 15/26; G10L 21/10; G06F 17/30; G06F 17/28
(Continued)

(56) References Cited

U.S. PATENT DOCUMENTS 5,987,401 A * 11/1999 Trudeau .............. H04L 12/1827
704/2
6,185,527 B1 2/2001 Petkovic et al.
(Continued)

FOREIGN PATENT DOCUMENTS

WO 2002/093414 11/2002
WO 2005062197 7/2005
WO WO 2005062197 A1 * 7/2005 ........... G06F 17/241

OTHER PUBLICATIONS

USPTO, Notice of Allowance for U.S. Appl. No. 13/447,488, dated Nov. 8, 2013, 8 pages.
(Continued)

*Primary Examiner* — Seong Ah A Shin
(74) *Attorney, Agent, or Firm* — IP Spring

(57) ABSTRACT

Techniques, systems, and devices for managing streaming media among end user devices in a video conferencing system are described. For example, a transcript may be automatically generated for a video conference. In one example, a method may include receiving a combined media stream comprising a plurality of media sub-streams each associated with one of a plurality of end user devices, wherein each of the plurality of media sub-streams comprises a respective video component and a respective audio component. The method may also include, for each of the media-sub-streams, separating the audio component from the respective video component, for each audio component of the respective media sub-streams, transcribing speech from the audio component to text for the respective media sub-stream, and combining the text for each of the respective media sub-streams into a combined transcription. In some examples, the combined transcription may also be translated into a user selected language.

19 Claims, 4 Drawing Sheets

Related U.S. Application Data

(60) Provisional application No. 61/529,607, filed on Aug. 31, 2011.

(51) Int. Cl.

| | | |
|---|---|---|
| *G06F 17/28* | (2006.01) | |
| *G10L 21/10* | (2013.01) | |
| *G10L 15/08* | (2006.01) | |
| *G06F 17/22* | (2006.01) | |
| *G06F 17/24* | (2006.01) | |
| *G06Q 30/02* | (2012.01) | |
| G10L 25/78 | (2013.01) | |
| H04L 29/06 | (2006.01) | |
| H04N 7/15 | (2006.01) | |

(52) U.S. Cl.
CPC ......... *G06F 17/28* (2013.01); *G06Q 30/0277* (2013.01); *G10L 15/26* (2013.01); *G10L 25/78* (2013.01); *G10L 2015/088* (2013.01); *H04L 65/403* (2013.01); *H04N 7/15* (2013.01)

(58) Field of Classification Search
USPC ................ 704/2, 3, 235, 260, 276
See application file for complete search history.

(56) References Cited

U.S. PATENT DOCUMENTS

| | | | |
|---|---|---|---|
| 6,546,405 B2 | 4/2003 | Gupta et al. | |
| 6,674,459 B2* | 1/2004 | Ben-Shachar | H04N 7/152 348/14.08 |
| 6,925,436 B1 | 8/2005 | Franz et al. | |
| 7,269,252 B2 | 9/2007 | Eran | |
| 7,272,597 B2 | 9/2007 | Chowdhury et al. | |
| 7,457,404 B1* | 11/2008 | Hession | H04M 3/5175 379/265.07 |
| 7,505,907 B2 | 3/2009 | Carro | |
| 7,554,576 B2* | 6/2009 | Erol | G06F 17/30244 348/159 |
| 7,711,569 B2 | 5/2010 | Takeuchi et al. | |
| 7,756,868 B2 | 7/2010 | Lee | |
| 7,769,705 B1 | 8/2010 | Luechtefeld | |
| 7,844,454 B2* | 11/2010 | Coles | G10L 15/26 704/231 |
| 8,121,277 B2* | 2/2012 | Baird | H04L 12/1831 370/260 |
| 8,126,705 B2 | 2/2012 | Aoki et al. | |
| 8,180,044 B1 | 5/2012 | McCormack et al. | |
| 8,346,757 B1 | 1/2013 | Lamping et al. | |
| 8,370,142 B2* | 2/2013 | Frankel | G10L 15/26 379/202.01 |
| 8,370,145 B2 | 2/2013 | Endo et al. | |
| 8,612,211 B1 | 12/2013 | Shires et al. | |
| 8,681,954 B1 | 3/2014 | Shires et al. | |
| 8,805,929 B2* | 8/2014 | Erol | G06F 17/30884 709/204 |
| 8,812,510 B2 | 8/2014 | Romanov et al. | |
| 8,831,999 B2* | 9/2014 | Bolton | H04N 21/4758 705/320 |
| 9,035,996 B1 | 5/2015 | Shires et al. | |
| 9,411,510 B2* | 8/2016 | Greenzeiger | G06F 3/04886 |
| 9,560,208 B2* | 1/2017 | Krack | H04M 3/569 |
| 9,756,091 B1* | 9/2017 | Davies | H04L 65/40 |
| 2002/0099552 A1 | 7/2002 | Rubin et al. | |
| 2002/0188681 A1 | 12/2002 | Gruen et al. | |
| 2003/0055711 A1 | 3/2003 | Doherty | |
| 2003/0204399 A1 | 10/2003 | Wolf et al. | |
| 2004/0098754 A1 | 5/2004 | Vella et al. | |
| 2004/0161082 A1 | 8/2004 | Brown et al. | |
| 2004/0186712 A1 | 9/2004 | Coles et al. | |
| 2005/0091696 A1 | 4/2005 | Wolfe et al. | |
| 2005/0234958 A1* | 10/2005 | Sipusic | G06F 3/0485 |
| 2005/0256905 A1 | 11/2005 | Gruhl et al. | |
| 2005/0262542 A1 | 11/2005 | DeWeese et al. | |
| 2007/0011133 A1 | 1/2007 | Chang | |
| 2007/0117508 A1 | 5/2007 | Jachner | |
| 2007/0124756 A1* | 5/2007 | Covell | G06F 17/30743 725/18 |
| 2007/0136251 A1 | 6/2007 | Colledge et al. | |
| 2007/0192103 A1 | 8/2007 | Sato et al. | |
| 2007/0206086 A1 | 9/2007 | Baron et al. | |
| 2007/0260684 A1 | 11/2007 | Sharma et al. | |
| 2007/0299815 A1 | 12/2007 | Starbuck et al. | |
| 2008/0010347 A1 | 1/2008 | Houghton et al. | |
| 2008/0044048 A1* | 2/2008 | Pentland | H04S 1/007 381/315 |
| 2008/0154908 A1 | 6/2008 | Datar et al. | |
| 2008/0208820 A1 | 8/2008 | Usey et al. | |
| 2008/0266382 A1 | 10/2008 | Smith et al. | |
| 2008/0281927 A1 | 11/2008 | Vanderwende et al. | |
| 2008/0295040 A1 | 11/2008 | Crinon | |
| 2008/0300872 A1 | 12/2008 | Basu et al. | |
| 2008/0306899 A1 | 12/2008 | Gregory et al. | |
| 2008/0319745 A1* | 12/2008 | Caldwell | H04M 1/2475 704/235 |
| 2009/0006982 A1 | 1/2009 | Curtis et al. | |
| 2009/0240488 A1 | 9/2009 | White et al. | |
| 2009/0282114 A1 | 11/2009 | Feng et al. | |
| 2009/0292768 A1 | 11/2009 | Franke | |
| 2009/0306981 A1* | 12/2009 | Cromack | G06F 17/30743 704/235 |
| 2010/0020955 A1 | 1/2010 | Wengrovitz | |
| 2010/0039558 A1 | 2/2010 | Detore | |
| 2010/0063815 A1 | 3/2010 | Cloran et al. | |
| 2010/0080528 A1 | 4/2010 | Yen et al. | |
| 2010/0141655 A1 | 6/2010 | Belinsky et al. | |
| 2010/0202670 A1 | 8/2010 | Tian et al. | |
| 2010/0241429 A1* | 9/2010 | Siminoff | G10L 15/265 704/235 |
| 2010/0246800 A1 | 9/2010 | Geppert et al. | |
| 2010/0251177 A1* | 9/2010 | Geppert | G06F 3/04817 715/821 |
| 2010/0268534 A1 | 10/2010 | Kishan et al. | |
| 2011/0022967 A1 | 1/2011 | Vijayakumar et al. | |
| 2011/0035445 A1 | 2/2011 | Eickhoff | |
| 2011/0040562 A1 | 2/2011 | Doyle et al. | |
| 2011/0041080 A1 | 2/2011 | Fleischman et al. | |
| 2011/0064318 A1 | 3/2011 | Gao et al. | |
| 2011/0126258 A1 | 5/2011 | Emerson et al. | |
| 2011/0131144 A1* | 6/2011 | Ashour | G06Q 10/10 705/319 |
| 2011/0149153 A1 | 6/2011 | Nam et al. | |
| 2011/0270609 A1 | 11/2011 | Jones et al. | |
| 2011/0271213 A1 | 11/2011 | Newman et al. | |
| 2012/0011158 A1 | 1/2012 | Avner et al. | |
| 2012/0046936 A1 | 2/2012 | Kandekar et al. | |
| 2012/0065969 A1 | 3/2012 | DeLuca et al. | |
| 2012/0089395 A1 | 4/2012 | Chavez et al. | |
| 2012/0110096 A1 | 5/2012 | Smarr et al. | |
| 2012/0162363 A1 | 6/2012 | Huang et al. | |
| 2012/0191692 A1 | 7/2012 | Wang | |
| 2012/0246191 A1 | 9/2012 | Xiong | |
| 2012/0265808 A1 | 10/2012 | Ezell et al. | |
| 2012/0306993 A1 | 12/2012 | Sellers-Blais | |
| 2012/0308206 A1 | 12/2012 | Kulas | |
| 2012/0314025 A1 | 12/2012 | Fiumi | |
| 2012/0316882 A1 | 12/2012 | Fiumi | |
| 2013/0007057 A1* | 1/2013 | Li | G06F 17/30265 707/769 |
| 2013/0031110 A1 | 1/2013 | Bhola et al. | |
| 2013/0097246 A1 | 4/2013 | Zifroni et al. | |
| 2013/0176413 A1 | 7/2013 | Lowry et al. | |
| 2013/0227006 A1 | 8/2013 | Raju | |
| 2013/0275504 A1 | 10/2013 | Patel et al. | |
| 2014/0028786 A1 | 1/2014 | Piccionielli | |
| 2014/0164501 A1 | 6/2014 | Herger et al. | |
| 2014/0236572 A1* | 8/2014 | Meshulam | G10L 15/18 704/9 |

(56) References Cited

U.S. PATENT DOCUMENTS

| | | | | |
|---|---|---|---|---|
| 2015/0106091 A1* | 4/2015 | Wetjen | ................... | G10L 15/26 704/235 |
| 2015/0154183 A1* | 6/2015 | Kristjansson | ......... | G06F 17/289 704/3 |
| 2015/0287403 A1* | 10/2015 | Holzer Zaslansky | . | G06T 13/205 704/231 |

OTHER PUBLICATIONS

USPTO, Non-Final Office Action for U.S. Appl. No. 13/743,838, dated May 21, 2013, 15 pages.
USPTO, Non-Final Office Action for U.S. Appl. No. 13/750,829, dated Apr. 8, 2013, 17 pages.
USPTO, Notice of Allowance for U.S. Appl. No. 13/743,838, dated Sep. 10, 2013, 9 pages.
USPTO, Final Office Action for U.S. Appl. No. 14/078,800, dated Jun. 5, 2015, 20 pages.
USPTO, Final Office Action for U.S. Appl. No. 13/750,829, dated Aug. 21, 2013, 26 pages.
USPTO, Non-Final Office Action for U.S. Appl. No. 14/185,879, dated Jun. 11, 2014, 4 pages.
USPTO, Notice of Allowance for U.S. Appl. No. 14/185,879, dated Jan. 20, 2015, 6 pages.
USPTO, Non-Final Office Action for U.S. Appl. No. 14/078,800, dated Jan. 5, 2015, 8 pages.
USPTO, Final Office Action for U.S. Appl. No. 14/185,879, dated Sep. 18, 2014, 5 pages.
Boulianne, et al., "Computer-assisted closed-captioning of live TV broadcasts in French", Interspeech, Sep. 17-21, 2006, 4 pages.
Expect Labs, "MindMeld", Retrieved from the Internet: <URL: www.expecllabs.com/mindmeld/, retrieved on Feb. 4, 2012, 6 pages.
Khan, et al., "Mining chat-room conversations for social and semantic interactions", Computer Science and Engineering, Lehigh University, 2002, 11 pages.
Robertson, "Google Rolls Out Automated Captioning for You Tube Videos", ReelSEO 2012 [online] Retrieved from the Internet: http://www.reelseo.com/google-rolls-automated-captioning/#author>, accessed Aug. 18, 2011, 12 pages.
Scott, "YouTube Enables Auto-Captioning for All Videos—As Expected", ReelSEO 2012 [online]. Retrieved from the Internet: <http://www.reelseo.com/youtube-enables-autocaptioning-videos/>, accessed on Aug. 18, 2011, 12 pages.
USPTO, Final Office Action for U.S. Appl. No. 13/599,908, dated Apr. 9, 2015, 19 pages.
USPTO, Non-final Office Action for U.S. Appl. No. 13/599,908, dated Nov. 6, 2014, 20 pages.
USPTO, Non-final Office Action for U.S. Appl. No. 13/599,908, dated Sep. 30, 2015, 22 pages.
USPTO, Notice of Allowance for U.S. Appl. No. 13/599,908, dated May 5, 2016, 33 pages.
YouTube, LLC, "Adding and Editing captions I subtitles", 2012 [online]. retrieved from the Internet: <http://support.google.com/youtube/bin/answer.py?hl=en&answer=10007 7>, accessed on Aug. 18, 2011, 3 pages.
Youtube, LLC, "Captions and Subtitles", 2012 [online]. Retrieved from the Internet: <http://www.youtube.com/l/captions_about>, accessed on Aug. 18, 2011, 1 page.

* cited by examiner

TEXT TRANSCRIPT GENERATION FROM A COMMUNICATION SESSION

This application is a continuation of U.S. patent application Ser. No. 13/599,908, filed Aug. 30, 2012 and titled TEXT TRANSCRIPT GENERATION FROM A COMMUNICATION SESSION, which claims the benefit of U.S. Provisional Patent Application No. 61/529,607, filed Aug. 31, 2011 and titled AUTOMATIC GENERATION OF TEXT TRANSCRIPT FROM A VIDEO CONFERENCE, both of which are hereby incorporated by reference in their entirety.

TECHNICAL FIELD

This disclosure relates to communication systems, and, more particularly, to virtual socializing or meeting over a network.

BACKGROUND

In a video conferencing system, two or more end users of computing devices may engage in real-time video communication, such as video conferencing, where end users (also referred to as participants) exchange live video and audio transmissions. Each end user may have a computing device that captures the media (e.g., video and audio) and sends it as a media stream to other end users. Each computing device may also receive media streams from other end user devices and display it for the corresponding end user.

SUMMARY

In one example, the disclosure is directed to a method for transcribing speech from a real-time communication session, the method including receiving, by one or more processors, a combined media stream comprising a plurality of media sub-streams each associated with one of a plurality of end user devices, wherein each of the plurality of media sub-streams comprises a respective video component and a respective audio component, separating, by the one or more processors, each of the media sub-streams from the combined media stream, for each of the media sub-streams, separating, by the one or more processors, the respective audio component from the respective video component, for each audio component of the respective media sub-streams, transcribing, by the one or more processors, speech from the audio component to text for the respective media sub-stream, and for each of the media sub-streams, associating, by the one or more processors, one or more time tags with respective portions of the text, wherein each of the one or more time tags indicate when respective portions of the text occurred within the real-time communication session. The method may also include combining, by the one or more processors, the text for each of the respective media sub-streams into a combined transcription based on the time tags associated with each respective portion of the text, wherein the respective portions of the text are arranged substantially chronologically within the combined transcription according to the time tags.

In another example, the disclosure is directed to a method that includes receiving, by one or more processors, a combined media stream comprising a plurality of media sub-streams each associated with one of a plurality of end user devices, wherein each of the plurality of media sub-streams comprises a respective video component and a respective audio component, for each of the media-sub-streams, separating, by the one or more processors, the respective audio component from the respective video component, for each audio component of the respective media sub-streams, transcribing, by the one or more processors, speech from the audio component to text for the respective media sub-stream, and combining, by the one or more processors, the text for each of the respective media sub-streams into a combined transcription.

In another example, the disclosure is directed to a server device comprising one or more processors configured to receive a combined media stream comprising a plurality of media sub-streams each associated with one of a plurality of end user devices, wherein each of the plurality of media sub-streams comprises a respective video component and a respective audio component, for each of the media-sub-streams, separate the respective audio component from the respective video component, for each audio component of the respective media sub-streams, transcribe speech from the audio component to text for the respective media sub-stream, and combine the text for each of the respective media sub-streams into a combined transcription.

The details of one or more implementations of the disclosure are set forth in the accompanying drawings and the description below. Other features, objects, and advantages of the disclosure will be apparent from the description and drawings, and from the claims.

DETAILED DESCRIPTION

Figure 1:
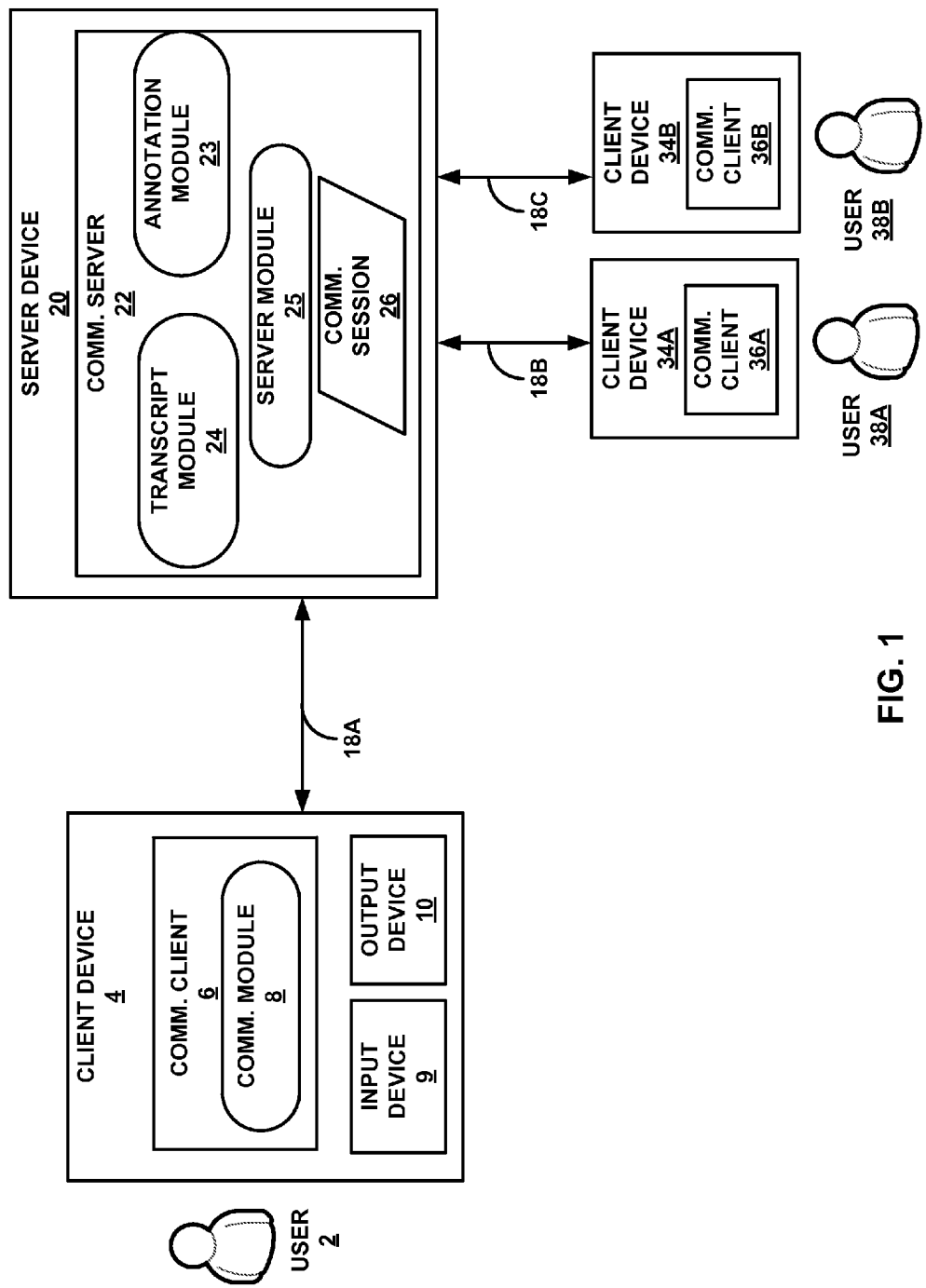
FIG. 1 is a block diagram illustrating an example of client devices connected to a communication session and configured to enable communication among users, in accordance with one or more aspects of this disclosure.

Friends, family members, or other individuals who wish to socialize or otherwise communicate may not be in the same physical location at the time they would like to communicate. In some examples, individuals may rely upon telephonic, text, or other forms of communication that support limited forms (e.g., a single mode of communication) of socializing. In one example, conventional forms of communication may support multi-way audio and/or video communication. However, some forms of communication are not sufficient to give the individuals an experience similar to actually socializing in person. Talking with someone over the phone or texting someone may not create a shared experience similar to sitting a room together while talking, watching a movie, or playing a game.

Rather than interacting together in the same physical location, two or more individuals may socialize in the same virtual location (e.g., a virtual communication session or real-time communication session). A virtual or real-time communication session is a virtual space where multiple users can engage in a conversation and/or share information. A virtual communication session may be in real-time when video and/or audio data captured from one end user is transmitted for display to another end user without any considerable delay (e.g., delays only substantially due to hardware processing and/or signal transmission limitations). For example, the individuals participating in a virtual "hangout" may share and watch videos, play games, participate in video, audio, or text chat, surf the web, or any combination thereof. In other words, multiple users may be able to socialize in a virtual hangout that may mirror the experience of individuals socializing or "hanging out" in the same physical location.

In systems that utilize video conferencing, transcriptions of the recorded video conference may be desirable to supplement the video and/or to allow users to read a previous portion of the conference in which a user missed or may have not completely understood during the video conference. Additionally, a user's native language may be different from the language of the speaker. Therefore, the user may wish to read a translated transcription of the video conference while listening to the audio of the video conference in the speaker's original language. In some examples, a recorded video (e.g., video that includes audio data) may be analyzed by an automatic transcriber to convert the speech within the audio data to text. However, in these systems, the speech may be merely transcribed without the ability to distinguish between different speakers. The transcription may thus frequently require additional manual input or modification to improve the usability of the transcription.

In general, this disclosure describes techniques for managing media streaming among end user devices in a video conferencing system and supplementing media streams using automatic transcription techniques. Media streams from all end user devices in a video conference or meeting may be combined and recorded. In one example, a transcript may be automatically generated for the recorded video conference. The audio streams from the different end user devices or participants in the video conference may be separated and processed such that sentences may be transcribed and identified with time tags and the corresponding end user. The transcribed sentences may then be combined into a transcript according to the time tags and identified according to end user identifiers for each sentence. The combined transcript may be transmitted with the recorded video conference for playback. In one example, end users that receive the combined transcript and video may select a language different from the original language of the transcript, and the transcribed speech may be translated and displayed in the selected language.

In some examples, the video conferencing system described herein may be a web-based media exchange system. The video conferencing system may include end user clients, which may be two or more devices configured to capture media associated with the end user and process the captured media for streaming to other end users. The end user clients may be devices such as, for example, computing devices that incorporate media capabilities (e.g., desktop computers, notebook computers, tablet computers, smartphones, mobile computing devices, smart watches, and the like). The media stream (e.g., the captured media streamed to an end user) may be communicated among end user devices over a network connection such as, for example, an internet network or a phone network. Additionally, the media streams from all end user devices may be managed by one or more servers (e.g., server devices) configured to manage information communication among the end user devices. In addition to the media stream management, the one or more servers may also be configured to manage other aspects of the video conferencing system such as, for example, document exchange. The techniques of this disclosure may be implemented by the end user clients and/or by one or more servers. In this manner, each of the functions and operations described herein may be performed by a single computing device and/or be distributed between multiple computing devices (e.g., a server and an end user client).

The media stream that end user devices exchange through the video conferencing system may include video and audio transmitted and received by the end user devices. In one aspect of this disclosure, the media stream may be adjusted or amended to include text information corresponding to one or more audio portions of the media stream. The text information may be generated as a transcription of one or more of the audio streams of the users in a video conference. The text information may be generated and obtained automatically or in response to a request from one or more users. Additionally, in one example, an end user may select a language different from the language associated with an audio portion of the media stream. In this example, the text information may be translated to the language selected by the end user. In other words, an end user may request that the text information is in a selected language, and a server and/or end user client may translate the text information into the selected language if the text information is originally generated in a language different than the selected language. In another example, during or following transcription, certain portions of text may be replaced with hyperlinks or references associated with the text (e.g., maps, phone number dialing, web elements, and the like).

Techniques of this disclosure may be implemented in a communication system that provides a virtual meeting capability (e.g., a video conference that may or may not include additional data sharing between the participants of the video conference) such as the system generally described above. During a virtual meeting, two or more end users may utilize end user devices (e.g., computing devices or mobile computing devices such as smart phones, tablet computers, etc.) to communicate, typically using media (e.g., video and/or audio). The virtual meeting may be administered and controlled by a central server, which may provide media management capabilities, in addition to management of other parameters associated with the virtual meeting. In one example, the type of media streams that an end user device may send to other end user devices via the server may depend on the capabilities and resources available to the end user. Some media capabilities and resources may be, for example, webcams, microphones, and the like. Additionally, during virtual meetings, end user devices may exchange and/or update other types of media such as, for example, documents, images, screen captures, and the like. The type of media available for display and/or playback at the end user device may depend on the type of device associated with the client and the types of media the client supports.

FIG. 1 is a block diagram illustrating an example of client devices connected to a communication session and configured to enable communication between users. FIG. 1 includes client devices 4, 34A, and 34B, and server device 20. Client device 4 may include input device 9, output device 10, and communication client 6, which further includes communication module 8. Communication client 6 may further cause or instruct output device 10 to display a graphical user interface (GUI). Client devices 34A, 34B are computing devices similar to client device 4 and may further include respective communication clients 36A, 36B, each similar to communication client 6.

As shown in the example of FIG. 1, server device 20 includes communication server 22, transcript module 24, server module 25, and communication session 26. Each of client devices 4 and client devices 34A and 34B (collectively "client devices 34"), and server device 20 may be connected by communication channels 18A, 18B, and 18C (collectively "communication channels 18"). Communication channels 18 may, in some examples, be wired or wireless communication channels configured to send and/or receive data. One example of communication channel 18 may include a Transmission Control Protocol and/or Internet Protocol (TCP/IP) network connection.

Client devices 4 and 34 may be communicatively coupled to a communication session 26 that enables communication between users of client devices 4 and 34, in accordance with one or more aspects of the present disclosure. Examples of client devices 4 and 34, may include, but are not limited to, portable or mobile computing devices such as mobile phones (including smart phones), laptop computers, personal digital assistants (PDAs), portable gaming devices, portable media players, smart watches, and e-book readers. Client device 4 and each of client devices 34 may be the same or different types of devices. For example, client device 4 and client device 34A may both be mobile phones. In another example, client device 4 may be a mobile phone and client device 34A may be a desktop computer.

Client devices 4 and 34 may include one or more input devices 9. Input device 9 may include one or more keyboards, pointing devices, microphones, and cameras capable of recording one or more images or video. Client devices 4 and 34 may also include respective output devices 10. Examples of output device 10 may include one or more of a video graphics card, computer display, sound card, and/or speakers.

Client devices 4 and 34 of FIG. 1 may include communication clients 6 and 36, respectively. Communication clients 6 and 36 may provide similar or substantially the same functionality. In some examples, communication clients 6 and 36 may include mobile or desktop computer applications that provide and support the functionality described herein. Communication clients 6 and 36 may also include respective communication modules such as communication module 8 as shown in communication client 6. Communication clients 6 and 36 may exchange audio, video, text, or other information with other communication clients connected to communication session 26. Communication module 8 may cause or otherwise instruct output device 10 to display a GUI. Communication module 8 may further include functionality that enables communication client 6 to connect to communication server 22 and join one or more communication sessions (e.g., communication session 26). Two or more client devices (e.g., client device 4 and client device 34) may join the same communication session 26 to enable communication between the client devices (e.g., a video conference or hangout).

The GUI of any of client devices 4 or 34 may include graphical elements such as a background, video feeds, and control buttons. Graphical elements may include any visually perceivable object that may be displayed in the GUI. Examples of graphical elements may include a background image, video feed, text, control buttons, input fields, and/or scroll bars. In one example, input device 9 may generate a visual representation of user 2. A visual representation may be a still image or group of images (e.g., a video). Communication client 6 may send the visual representation to communication server 22, which may determine that communication clients 6 and 36 are connected to communication session 26. Consequently, communication server 22 may send the visual representation of user 2 to communication clients 36A and 36B as video feeds. Communication clients 36A and 36B may, upon receiving the visual representation, cause an output device of client devices 34A and 34B to display the video feeds. Similarly, client device 4 may receive visual representations of users 38A and 38B, which are in turn included as video feeds in the GUI of client device 4. The display of respective video feeds at client devices 4 and 34 may be substantially simultaneous to support the real-time communication session of the video conference.

In addition to exchanging video information, communication clients 6 and 36 may exchange audio, text and other information via communication session 26. For instance, microphones may capture sound at or near each of client devices 4 and 34, for example, voices of respective users 2 and respective users 38A and 38B (collectively "users 38"). Audio data generated from the sound by client devices 4 and 34, may be exchanged between communication clients 6 and 36 connected to communication session 26 of communication server 22. For instance, if user 2 speaks, input device 9 of client device 4 may receive the sound and convert it to audio data. Communication client 6 may then send the audio data to communication server 22. Communication server 22 may determine that communication client 6 is connected to communication session 26 and further determine that other communication clients 34A and/or 34B are connected to communication session 26. Upon determining that communication clients 36A and 36B are connected to communication session 26, communication server 22 may send the audio data to each of the respective communication clients 26. In still other examples, text such a real-time instant messages or files may be exchanged between communication clients 6 and 36 using similar techniques.

As shown in FIG. 1, server device 20 includes communication server 22, annotation module 23, transcript module 24, server module 25, and communication session 26. Examples of server device 20 may include a personal computer, a laptop computer, a handheld computer, a workstation, a data storage system, a supercomputer, or a mainframe computer. In some examples, server device 20 may include two or more computing devices. Communication server 22 may be configured to generate, manage, and terminate communication sessions such as communication session 26. In some examples, communication server 22 may be an application executing on server device 20 configured to perform operations described herein.

In one example, server module 25 of communication server 22 may receive a request to generate communication session 26. For instance, communication client 6 may send a request to communication server 22 that causes server module 25 to generate communication session 26. Upon generating communication session 26, other communication clients, such as communication clients 36, may also connect to communication session 26. For instance, user 2 may cause communication client 6 to send invitations to client devices 34A and 34B of users 38A and 38B. Upon receiving the invitations, users 38A and 38B may cause communication clients 36A and 36B to send requests to communication server 22 to join communication session 26. Server module 25, upon receiving each of the requests, may connect each of the respective communication clients 36 to communication session 26. In other examples, users 38A and 38B may discover communication session 26 by browsing a feed (e.g., a news feed or list of virtual communication sessions) that includes an indicator identifying communication session 26. Users 38 may similarly join communication session 26 by sending requests to communication server 22.

As described herein, communication session 26 may enable communication clients connected to communication session 26 to exchange information. Communication session 26 may include data that, among other things, specifies communication clients connected to communication session 26. Communication session 26 may further include session information such as duration of the communication session, security settings of the communication session, and any other information that specifies a configuration of the communication session. Server module 25 may send and receive information from communication clients connected to communication session 26 thereby enabling users participating in the communication session to exchange information. Communication server 22 may also include a transcript module 24 and annotation module 23 each configured to implement one or more techniques of the present disclosure.

As shown in FIG. 1, communication server 22 may include transcript module 24. In some examples, transcript module 24 may receive and send information related to media streams such as, for example, audio content. For example, a media stream corresponding to a video conference may be recorded and processed by server device 20. The audio component of the media stream may be provided to transcript module 24. The audio component (e.g., audio stream) of the media stream may include audio components (e.g., multiple audio subcomponents) corresponding to each of users 2 and 38. Transcript module 24 may process each audio component for each of the users by running them through a speech-to-text engine configured to generate a transcription of the audio streams. During processing of each audio stream, time tags may be inserted into the corresponding text for each audio stream, so that the overall transcript may be generated for the entire video conference by arranging the transcribed speech of each audio stream by time tags to generate text of the speech of all the users, as will be described in more detail below. The completed transcribed speech of the video conference may then be communicated to one or more of end users 2 and 38 and displayed for them on their corresponding client devices 4 and 34.

In one example, the process for transcribing speech during a real-time communication session (e.g., communication session 26) may include receiving a combined media stream comprising a plurality of media sub-streams each associated with one of a plurality of end user devices (e.g., client devices 4 and 34). Each of the plurality of media sub-streams may include a respective video component and a respective audio component. The video component may include a set of images representing the video, and the audio component may include audio data representative of speech and/or additional sounds recorded from the respective client device 4 or 34.

For each of the media sub-streams, the audio component may be separated from the respective video component. In addition, for each audio component of the respective media sub-streams, speech from the audio component may be transcribed into text for the respective media sub-stream. In this manner, each of the media sub-streams may have a corresponding text transcription. The process may then include combining the text for each of the respective media sub-streams into a combined transcription. As described in some examples herein, server device 20 may be configured to perform the operations of the transcription process. In some examples, one or more modules, such as transcript module 24, may be operable by the one or more processors of server device 20 to perform the operations of the transcription process.

In some examples, the transcription process may also include, prior to separating the audio component from the respective video component, separating each of the media sub-streams from the combined media stream. In this manner, the audio components of each media sub-stream may be separated or extracted from the respective media sub-stream subsequent to the media sub-streams being separated from the combined media stream.

Server device 20, for example, may generate the combined transcription using time tags that identify where each portion of speech occurred within the real-time communication session (e.g., communication session 26). For example, for each of the media sub-streams, server device 20 may associate one or more time tags with respective portions of the text transcribed from the audio components. The one or more time tags may each indicate when respective portions of the text occurred within the real-time communication session. In addition, combining the text for each of the respective media sub-streams into the combined transcription may include combining the text for each of the respective media sub-streams into the combined transcription based on the time tags associated with each respective portions of the text. In this manner, the respective portions of the text may be arranged substantially chronologically within the combined transcription according to the time tags. In one example, each phrase or sentence of the text may be associated with a time tag representing the time during the real-time communication at which the phrase or sentence began.

Server device 20 may be configured to output, for display at one or more of the end user devices (e.g., client device 4 and/or client devices 34), the combined transcription. In this manner, server device 20 may be configured to provide the combined transcription to an end user device for purposes of display at one or more end user devices associated with a user. For example server device 20 may generate the combined transcription and transmit the combined transcription to one or more of client devices 4 and 34. The client device that receives the combined transcription may then display the combined transcription for review by the associated user.

In one example, the transcribed video conference may be provided to those users who indicate their desire to receive a transcription of the video conference. In other words, each user may need to request or opt-in to receiving the transcription. In another example, the transcription may be provided to all users. In one example, a user may indicate a language selection that is different from the default language of the system. In this example, transcript module 24 may include a translation algorithm or may utilize a translation algorithm or application program interface (API) to translate the transcribed speech to the selected language(s) indicated by users. In this manner, each of users 2 and 38 may request select different languages for the respective transcriptions to support communication between users of different languages. The transcribed and/or translated text may then be provided to the corresponding users.

In response to a client device (e.g., client devices 4 or 34) receiving an input selecting a language for the transcription, sever device 20 may be configured to receive an indication of the selected language from the user associated with the one of the plurality of end user devices. The indication may be a signal or data representative of the selected language. In response to receiving the indication of the selected language, server device 20 may be configured to translate the combined transcription into the selected language. Server device 20 may also be configured to output, for display at the one of the end user devices associated with the user, the translation of the combined transcription. In this manner, server device 20 may be configured to provide the translation of the combined transcription for purposes of display at the one of the end user devices associated with the user.

In another example, during transcription, annotation module 23 may monetize the transcript by using it to guide users towards advertisements based on content of and/or keywords in the transcript. For example, if users are speaking about cars, advertisements related to cars may be presented on the displays of client devices 4 and 34 for the respective users when the transcript is presented or displayed to the users. Annotation module 23 may present the advertisements within the text and adjacent to the subject matter similar text. Alternatively, annotation module 23 may present the advertisements in a border or next to a field containing the transcribed text. In other examples, annotation module 23 may select the appropriate advertisements and send the advertisements and/or a link to the advertisements to the communication server 22. Communication server 22 may then insert the advertisements into the appropriate field or area of the screen for display at one or more client devices 4 and 34.

In another example, annotation module 23 may insert hyperlinks into the transcribed text based on an Internet search. In one illustrative example, if text corresponding to what may be interpreted as a street address of a property, a link to a map to the address may be inserted as a hyperlink for the corresponding text. In another illustrative example, if the transcribed text corresponds to a phone number, a link to dial the number may be provided. In yet another illustrative example, links to images, videos, music, articles, or the like may be inserted into the transcribed text based on an Internet search, and so forth. In this manner, server device 20 may be configured to supplement the transcriptions for each user with information and/or shortcuts that may be useful to the respective user. Although the same information may be inserted into the transcripts transmitted to each of client devices 4 and 34, server device 20 may be configured to populate specific transcripts for each of users 2 and 38 differently. For example, server device 20 may be configured to use Internet search results, contact information, or any other user specific information to customize the additional information provided in the transcript for each user.

In this manner, annotation module 23 (or one or more processors of server device 20, for example) may be configured to annotate the transcribed text for the audio component of each respective media sub-stream to include additional content. Annotation of the text may include determining one or more keywords of the text. The keywords may be nouns, pronouns, addresses, phone numbers, or any other words or phrases identified as important based on the context of the transcription and/or the frequency with which the word or phrase is used. The additional content for the transcription may be selected based on the one or more keywords. For example, the additional content may be a web element (e.g., a picture, text, or other feature) or a hyperlink (e.g., a link to a web element) selected based on the one or more keywords and inserted into the text. The additional content may be inserted in place of the one or more associated keywords or near the keyword. In other examples, the additional content may be one or more advertisements selected based on the one or more keywords. Annotation module 23, for example, may match an advertisement indexed within a database (e.g., a database stored within server device 20 or stored in a repository networked to server device 20) to the one or more keywords. The advertisement may be presented within the transcript or otherwise associated with the real-time communication session.

As described herein, each of the plurality of media sub-streams may be generated during a real-time communication session (e.g., communication session 26). For example, each of client devices 4 and 34 may generate the respective media sub-streams with audio components and video components captured at each client device. The combined transcription generated by transcript module 24, for example, may be representative of at least a portion of speech during the real-time communication session.

Although the combined transcript may cover the entire duration of the real-time communication session, the transcript may only be generated for a requested portion of the real-time communication session. For example, a user may request a transcript for only certain portion of the real-time communication sessions. Alternatively, the combined transcript may only be generated with the approval of all users associated with the real-time communication session. If at least one user provides input requesting that a transcript is not generated for the real-time communication session, server device 20 may refrain from memorializing any of the speech of real-time communication session into a transcript. In other examples, all of the users of a real-time communication session may be required to opt-in to a transcript before server device 20 will generate a transcript of the real-time communication session.

Communication session 26 may support a video communication session between three users (e.g., user 2, user 38A, and user 38B). In other examples, communication session 26 may only include two users (e.g., user 2 and user 38A). In alternative examples, four or more users, and respective client devices, may be connected to the same communication session. Further, communication session 26 may continue even though one or more client devices connect and/or disconnect to the communication session. In this manner, communication session 26 may continue as long as two client devices are connected. Alternatively, communication session 26 may only continue as long as the user who started communication session 26 remains connected.

Figure 2:
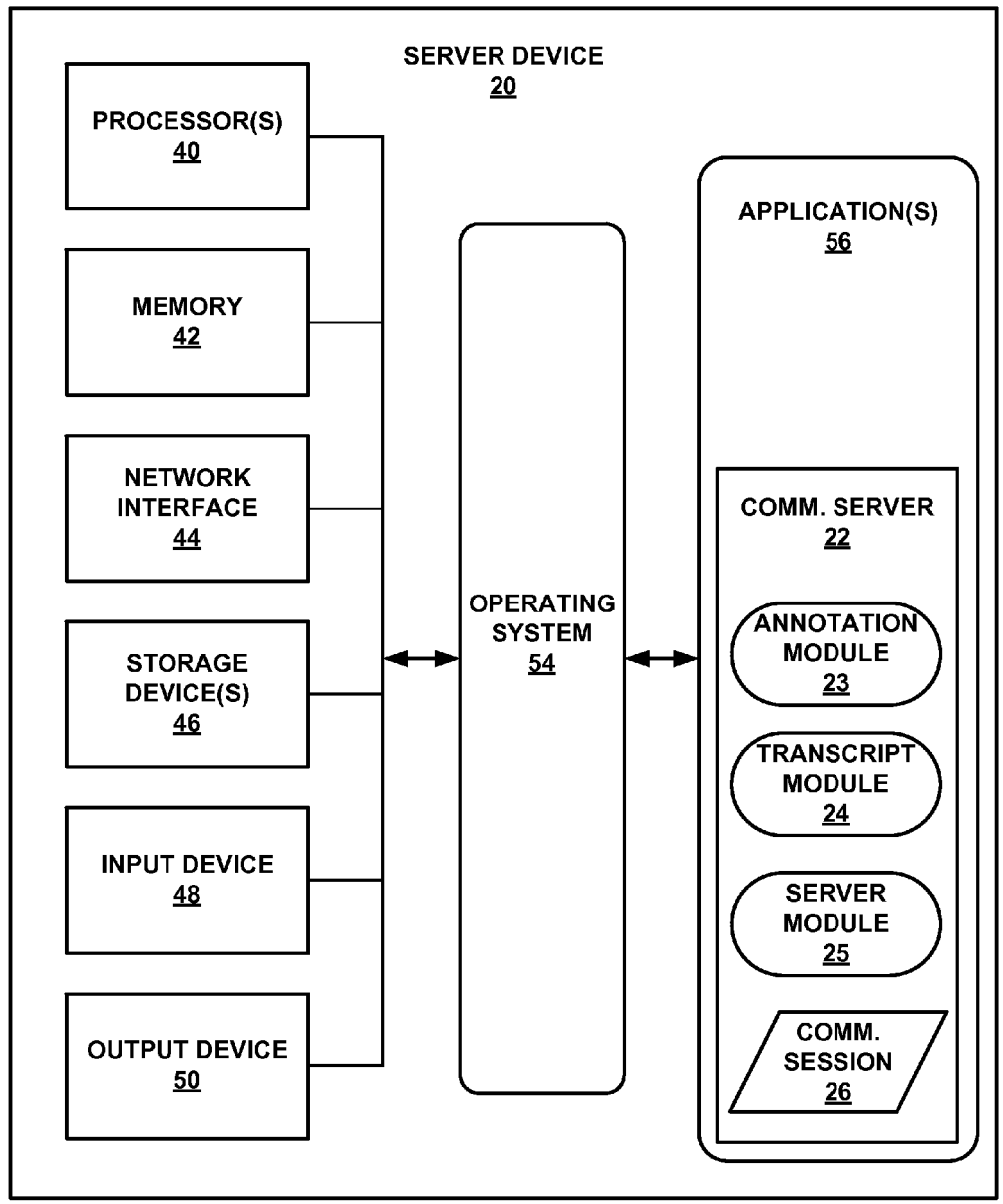
FIG. 2 is a block diagram illustrating further details of one example of a server device shown in FIG. 1.

FIG. 2 is a block diagram illustrating further details of one example of server device 20 shown in FIG. 1. FIG. 2 illustrates only one particular example of server device 20, and many other example embodiments of server device 20 may be used in other instances. For example, the functions provided by server device 20 may be performed by two or more different computing devices.

As shown in the specific example of FIG. 2, server device 20 includes one or more processors 40, memory 42, a network interface 44, one or more storage devices 46, input device 48, and output device 50. Server device 20 may also include an operating system 54 that is executable by server device 20. Server device 20, in one example, further includes communication server 22 that is also executable by server device 20. Each of components 40, 42, 44, 46, 48, 50, 54, 56, and 22 may be interconnected (physically, communicatively, and/or operatively) for inter-component communications.

Processors 40, in one example, are configured to implement functionality and/or process instructions for execution within server device 20. For example, processors 40 may be capable of processing instructions stored in memory 42 or instructions stored on storage devices 46.

Memory 42, in one example, is configured to store information within server device 20 during operation. Memory 42, in some examples, is described as a computer-readable storage medium. In some examples, memory 42 is a temporary memory, meaning that a primary purpose of memory 42 is not long-term storage. Memory 42, in some examples, is described as a volatile memory, meaning that memory 42 does not maintain stored contents when the computer is turned off (e.g., powered down). Examples of volatile memories include random access memories (RAM), dynamic random access memories (DRAM), static random access memories (SRAM), and other forms of volatile memories known in the art. In some examples, memory 42 is used to store program instructions for execution by processors 40. Memory 42, in one example, is used by software or applications running on server device 20 (e.g., applications 56) to temporarily store information during program execution.

Storage devices 46, in some examples, also include one or more computer-readable storage media. Storage devices 46 may be configured to store larger amounts of information than memory 42. Storage devices 46 may further be configured for long-term storage of information. In some examples, storage devices 46 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Server device 20, in some examples, also includes a network interface 44. Server device 20, in one example, utilizes network interface 44 to communicate with external devices via one or more networks, such as one or more wireless networks. Network interface 44 may be a network interface card, such as an Ethernet card, an optical transceiver, a radio frequency transceiver, or any other type of device that can send and receive information. Other examples of such network interfaces may include Bluetooth®, 3G and WiFi® radios in mobile computing devices as well as USB. In some examples, server device 20 utilizes network interface 44 to wirelessly communicate with an external device such as client devices 4 and 34 of FIG. 1, a mobile phone, or any other networked computing device.

Server device 20, in one example, also includes one or more input devices 48. Input device 48, in some examples, is configured to receive input from a user through tactile, audio, or video feedback. Examples of input device 48 include a presence-sensitive screen, a mouse, a keyboard, a voice responsive system, video camera, microphone or any other type of device for detecting a command from a user. In some examples, a presence-sensitive screen may include a touch-sensitive screen.

One or more output devices 50 may also be included in server device 20. Output device 50, in some examples, may be configured to provide output to a user using tactile, audio, or video stimuli. Output device 50, in one example, may include a presence-sensitive screen, a sound card, a video graphics adapter card, or any other type of device for converting an electrical signal into an appropriate form understandable to humans or machines. Additional examples of output device 10 may include a speaker, a cathode ray tube (CRT) monitor, a liquid crystal display (LCD), or any other type of device that can generate intelligible output to a user.

Server device 20 may also include operating system 54. Operating system 54, in some examples, is configured to control the operation of components of server device 20. For example, operating system 54, in one example, facilitates the interaction of communication server 22 with processors 40, memory 42, network interface 44, storage device 46, input device 48, and/or output device 50. As shown in the example of FIG. 2, communication server 22 may include annotation module 23, transcript module 24, server module 25, and communication session 26 described in FIG. 1. Communication server 22, annotation module 23, transcript module 24, and server module 25 may each include program instructions and/or data that are executable by server device 20. For example, annotation module 23, transcript module 24 and server module 25 may include instructions that cause communication server 22 executing on server device 20 to perform one or more of the operations and actions described in the present disclosure.

In one example, network interface 44 may receive multiple video feeds (e.g., a portion of the media streams) from communication clients (e.g., communication clients 6 and 36 of FIG. 1) connected to communications session 26. In some examples, the video feeds may include visual representations of users of each of the respective communication clients. Upon receiving each of the video feeds, server module 25 may be configured to determine which communication clients are connected to communication session 26. Server module 25 may cause network device 44 to send the video feeds to each of the communication clients connected to communication session 26 for display at the GUIs of each of the other communication devices that include the respective communication clients. In this way, users participating in communication session 26 may view visual representations of other users participating in the communication session. As one example, server module 25 may receive a video feed from communication client 6 of client device 4 to each of communication clients 36 of client devices 34. Server module 25 may similarly transmit other received video feeds to the other remaining communication clients.

Network interface 44 may also receive media streams from each of the users, wherein the media streams correspond to a current video conference or meeting session. The media streams may include video and audio components corresponding to each end user device connected to the current session or meeting. The media streams may be distributed to each of the end user devices such that each end user device receives the media streams associated with the other end user devices connected to the video meeting. As discussed herein, transcript module 24 may receive a recorded video meeting and automatically generate a transcript of the speech associated with the video meeting. The transcribed speech of the video conference may then be communicated to end users 2 and 38 and displayed at the corresponding client devices 4 and 34.

Communication server 22 may be one of applications 56 executable on server device 20. Communication server 22 may also include sub-applications annotation module 23, transcript module 24, server module 25, and communication session 26. In this manner, each of the sub-applications may be executed within communication server 22. In other examples, one or more of the sub-applications may be executed separately, but in communication with, communication server 22. In this manner, each of annotation module 23, transcript module 24, server module 25, and communication session 26 may be separate applications 56 that each interface with communication server 22.

Communication server 22 may support one communication session 26 at any given time. In other examples, communication server 22 may execute two or more communication sessions simultaneously. Each communication session may support a virtual communication session between a distinct subset of users. In this manner, server device 20 may be configured to provide virtual communication sessions between any number of subsets of users simultaneously.

Figure 3:
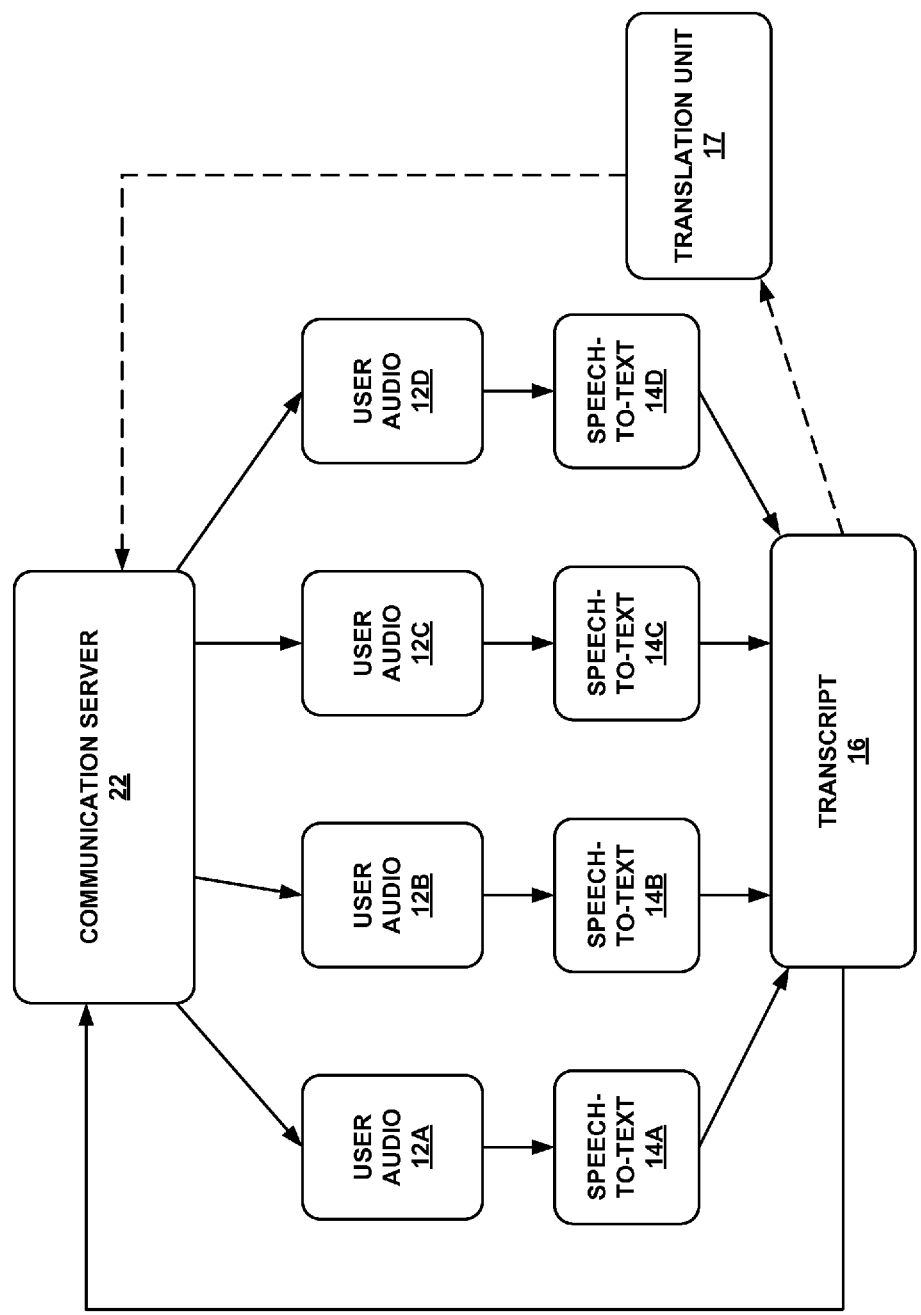
FIG. 3 is a block diagram illustrating one example of a system configured to enable generation of transcription of a video conference.

FIG. 3 is a block diagram illustrating one example of a system configured to enable generation of transcription of a video conference. Following a video conference or meeting, the combined media stream (e.g., the media stream that includes each media stream from each client device) associated with the video conference may be available at communication server 22. In one example, communication server 22 may be configured to provide the combined media stream for playback of the video conference to users connected to communication server 22. The combined media stream may include video and audio components associated with each of the users connected to communication server 22 during the corresponding video conference. The audio and video streams may be captured at each end user device's end and transmitted to a connecting server (e.g., server device 20). Therefore, in the combined media stream, the individual media streams from each of the end user devices may be separable from each other.

Communication server 22 may also be configured to separate the audio components from the video components within each of the media stream, thus providing user audio components 12 corresponding to all respective end user devices associated with the video conference. Alternatively, communication server 22 may be configured to separate the audio components from the video components within the combined media stream and then separate the audio data of respective individual users. The resulting separated audio data is represented as user audio 12A, 12B, 12C, and 12D (collectively "audio components 12"), where each of user audio 12 is associated with a respective client device and/or user.

Server device 20 may then send each of audio components 12 to respective speech-to-text units 14A, 14B, 14C, and 14D (collectively "speech-to-text units 14"), which may be, for example, one or more APIs or algorithms implemented or executed by transcript module 24. Alternatively, each of audio components 12 may be separately sent to a single speech-to-text unit configured to process each of the audio components separately. Although speech-to-text units 14 may be separate modules, speech-to-text units 14 may alternatively be included within one or more transcript modules (e.g., transcript module 24 of server device 20). For example, communication server 22 may send audio components 12 to transcript module 24.

Speech-to-text units 14 may process each of audio components 12, where each audio component 12 may be broken into sentences based on pauses in the audio of audio component 12, for example. In other words, speech-to-text units 14 of communication server 22 may be configured to identify pauses or periods of non-speech indicative of breaks between portions (e.g., sentences or phrases) of the speech of each respective audio component 12. In one example, each pause may be identified by a minimum or near zero amplitude of the audio signal. Alternatively, the pause may be identified by a continuous signal value for a predetermined amount of time. In any example, the audio pauses may signal the end of a sentence or phrase. In this manner, speech-to-text units 14 may be configured to generate, for each of the respective audio components 12 of the media streams, a plurality of portions of audio (e.g., sentences or phrases) based on the identified pauses in speech. The beginnings and ends of the sentences may be marked with time tags, which may be information retrieved from each audio component 12. In other words, each audio component 12 may include a timeline or time information for tracking the audio data within each audio component 12. Speech-to-text units 14 may then convert the speech of the audio streams to text for each of the sentences from each of user audio components 12. In other examples, the portions of audio may be transcribed prior to marking each portion of text with time tags (e.g., either audio data or transcribed text may be time tagged). In some examples, each portion (e.g., sentence or phrase) of the respective audio component 12 may also be tagged with the speaker's name, handle, and/or any other identifier of the source of the portion of audio.

Speech-to-text units 14 may also be configured to generate transcript 16 by inserting the text into a sequence according to the associated time tags. During insertion of the sentences according to the time tags, speech-to-text units 14 may also insert an identifier associated with the end user associated with each sentence based on which of audio components 12 the sentence came from. As a result, transcript 16 may include a sequence of transcribed sentences in a chronological order and with identifiers of the corresponding speaker (e.g., which end user), identified by the respective end user device. Server device 20 may be configured to then transmit transcript 16 back to communication server 22, which may distribute transcript 16 to end user devices (e.g., client devices 4 and 34) associated with the video conference for display along with playback of the corresponding video conference. In other examples, a module or submodule different than speech-to-text units 14 (e.g., transcript module 24 of FIGS. 1 and 2) may arrange the text from each speech-to-text unit 14 into the chronological order of transcript 16.

In one example, server device 20 may be configured to translate transcript 16. One or more of the end users may indicate a language selection or select a preferred language that is different from the default language of the text in transcript 16. In this example, server device 20 may be configured to transmit transcript 16 to translation unit 17. Translation unit 17 may be configured to then translate transcript 16 into one or more languages selected by the respective end users. The translated transcript may then be transmitted to communication server 22 from translation unit 17. Communication server 22 may then distribute the translated transcripts to the corresponding end user devices. In other examples, client device (e.g., client devices 4 and 34) of the respective end users may be configured to translate the received transcript 16 into the selected language.

Speech-to-text units 14 (e.g., transcript module 24) may translate the speech into text for a default language. In some examples, speech-to-text units 14 may be configured to operate for a language selected based on a preference or location of each end user. For example, if the end user generating user audio 12A resides in France, speech-to-text unit 14A may operate in a transcription mode for French. In another example, the end user that generated user audio 12A may have selected a preference or indication that the user will be speaking French such that speech-to-text unit 14A operates to transcribe French. Alternatively, each of speech-to-text units 14 may automatically identify the spoken language of the speech and transcribe the speech according to the identified language.

In some examples, speech-to-text units 14 may transcribe the speech into the language compatible with additional features, such as annotation operations described herein. In other examples, if communication server 22 identifies that all end users speak the same language, communication server 22 may instruct speech-to-text units 14 to transcribe the speech into the identified common language or request that transcript 16 be immediately sent to translation unit 17 for each user.

In one example, transcript 16 (or a translated transcript from translation unit 17) may be provided to end users who indicate their desire to receive a transcription of the video conference. In another example, transcript 16 may be provided to all end user devices. In one example, during transcription, speech-to-text unit 14 (e.g., transcript module 24) may additionally monetize transcript 16 by using it to guide users towards advertisements based on content of the transcript. For example, if users are speaking about cars, advertisements related to cars may be presented on the displays of client devices 4 and 34 for the users when transcript 16 is presented or displayed to the end users. In another example, speech-to-text units 14 may insert hyperlinks into transcript 16. The hyperlinks may replace words or phrases within transcript 16 and/or be inserted next to a word or phrase. The selected hyperlinks may be based on an Internet search for the word or phrase replaced by the hyperlink. In one illustrative example, if a text corresponding to what may be interpreted as a physical address (e.g., an address of a business or an individual), a link to a map to the address may be inserted as a hyperlink for the corresponding text. In another illustrative example, if the transcribed text corresponds to a phone number, a link to dial the number may be provided in place of or next to the text of the phone number. In yet another illustrative example, links to images, videos, music, articles, or the like may be inserted into the transcribed text based on an Internet search, and so forth.

In some examples, transcript 16 may be generated after the video conference has been completed. Therefore, transcript 16 may be sent to each user for review of the video conference. Alternatively, speech-to-text units 14 may transcribe the speech and generate transcript 16 as the video conference is executed. Communication server 22 may retrieve the combined media stream in real-time (e.g., as the combined media stream is generated and transmitted, communication server 22 may simultaneously process the combined media stream for generation and/or amendment of transcript 16). During the video conference, speech-to-text units 14 may this continually transcribe speech into text and update transcript 16 while the end users are communicating. Translation unit 17 may also continually translate the necessary text before the transcript is sent to the end users. In this manner, transcript 16 may be continually updated to include recently generated text. Transcript 16 may thus be updated for each end user as new text is added or segments (e.g., words, phrases, or sentences) of transcript 16 may be transmitted to each user as the segments are generated.

In other examples, transcript 16 may be monetized with advertisements and/or populated with annotations (e.g., hyperlinks or supplemental information) after the initial text is transmitted to each end user. In this manner, communication server 22 may send transcribed text to users as soon as possible. After the text is transmitted, annotation module 23 or transcript module 24 of FIGS. 1 and 2, as examples, may analyze the text and update the previously transmitted text of transcript 16 with new annotations. Such post-processing of the transcribed text may decrease any delay in transmission of transcript 16 as the video conference continues.

Each of the modules described in FIG. 3 may be various software modules, applications, or sets of instructions executed by one or more processors of server device 20 and/or one or more client devices 4 and 34. In one example, communication service 22, speech-to-text units 14, and translation unit 17 may be configured as separate APIs. In any example, each module may be configured to perform the functions described herein.

Figure 4:
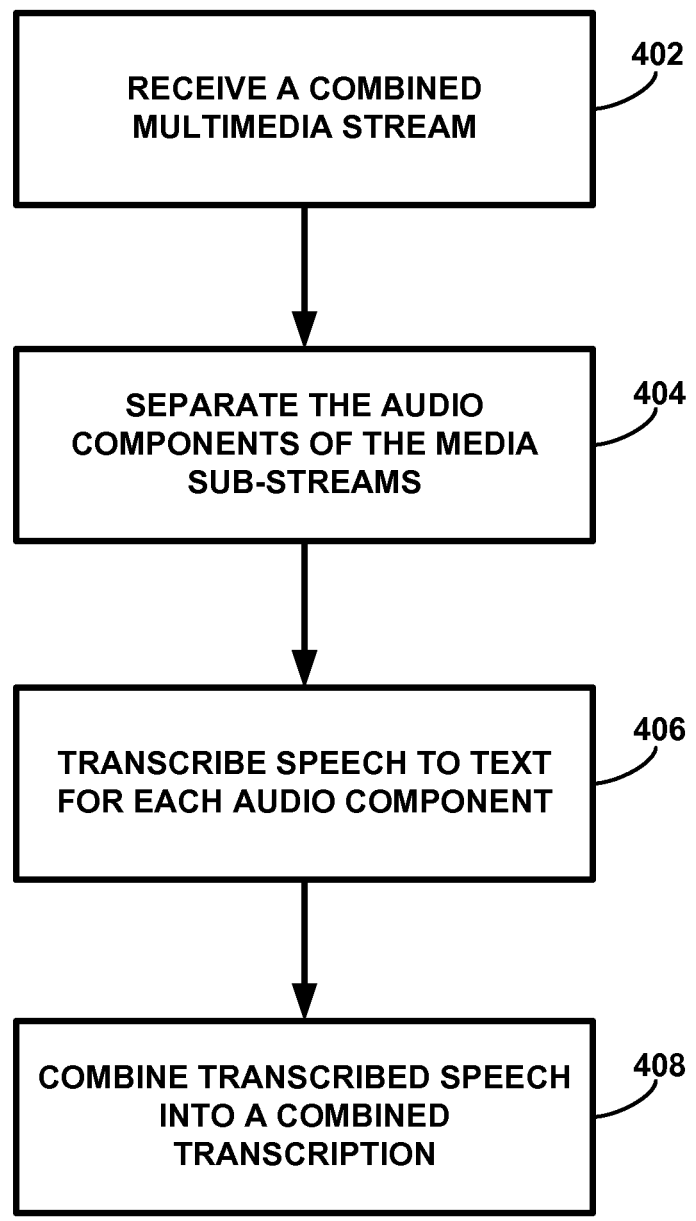
FIG. 4 is a flow diagram illustrating and example process for transcription of audio from a video conference.

FIG. 4 is a flow diagram illustrating an example process for generation of a transcription of audio from a video conference. The process of FIG. 4 may be performed by one or more devices in a communication system, such as the system illustrated in FIG. 1, for example. In one example, the method may be performed by a server (e.g., server device 20). Server device 20 may include, among other components, one or more processors 40, annotation module 23, and transcript module 24. In other examples, one or more aspects of the process of FIG. 4 may be performed by one or more additional devices (e.g., client devices 4 or 34) in a distributed manner. The process of FIG. 4 will be described with respect to server device 20. One or more processors of server device 20 may be configured to perform the process of FIG. 4. Alternatively, other devices or modules (of server device 20 and/or other computing devices) may perform similar functions. Although different modules may perform the operations of FIG. 4 (e.g., communication server 22 and transcript module 24), a single module such as transcript module 24 may, in other examples, perform each operation associated with receiving media streams and transcribing speech from the media streams.

As shown in FIG. 4, communication server 22 may be configured to receive a combined media stream that includes video components and audio components from each of two or more client devices associated with respective end users (402). The combined media stream may include media sub-streams each associated with respective two or more end user devices. Each media sub-stream may include a video component and an audio component. Communication server 22 may be configured, in response to receiving the combined media stream, separate the combined media stream into the respective media sub-streams and separate the respective audio components from each of the respective media sub-streams (404). Each of the respective audio components may correspond to one end user device (e.g., the speech of one user associated with the end user device).

Communication server 22 may then send the audio components to transcript module 24 (e.g., a module that includes one or more speech-to-text units). Transcript module 24 may be configured to then transcribe the speech of each audio component in each respective media sub-stream to the appropriate text (406). Transcript module 24 may, in some examples, time tag the beginning and/or end of each phrase or sentence of the transcribed text for later assembly in chronological order. In this manner, transcript module 24 may separately generate text for the recorded speech from each end user. Transcript module 24 may be configured to then combine the transcribed speech for each audio component of each respective media sub-stream into a combined transcription (408).

In some examples, a translation module may subsequently translate the combined transcription into a language selected by one or more of the end users. The translation module may be independent from transcript module 24 or included in transcript module 24. In other examples, annotation module 23 of server device 20 may be configured to annotate the combined transcription to insert or update the transcription to include additional information. For example, annotation module 23 may insert advertisements associated with the subject matter of one or more aspects of the combined transcription. Annotation module 23 may additionally or alternatively replace words or phrases of the combined transcription with hyperlinks and/or information that supplements the combined transcript. In this manner, the combined transcript may be generated to be interactive for one or more of the end users.

Although the techniques of this disclosure are described in the context of one type of system, e.g., a video conferencing system, it should be understood that these techniques may be utilized in other types of systems where multiple users provide multimedia streams to a central device (e.g., bridge, server, or the like) to be distributed to other users in multiple locations.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in a computer-readable storage medium containing instructions. Instructions embedded or encoded in a computer-readable storage medium may cause one or more programmable processors, or other processors, to implement one or more of the techniques described herein, such as when instructions included or encoded in the computer-readable storage medium are executed by the one or more processors. Example computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or any other computer-readable storage devices or tangible computer-readable media. In some examples, an article of manufacture may comprise one or more computer-readable storage media.

In some examples, computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

Various implementations of the disclosure have been described. These and other implementations are within the scope of the following examples.

What is claimed is:

1. A method for transcribing speech in a communication session comprising:
    transmitting a virtual communication session in substantially real-time to a plurality of end user devices;
    receiving, by one or more processors, a combined media stream comprising a plurality of media sub-streams each associated with one of the plurality of end user devices, wherein each of the plurality of media sub-streams in the combined media stream comprises a respective video component and a respective audio component;
    for each of the plurality of media sub-streams, separating, by the one or more processors, the respective audio component from the respective video component;
    for each separate audio component, transcribing, by the one or more processors, at least a portion of speech from the audio component to text;
    providing a transcription in substantially real-time; and
    annotating the text for the audio component of each respective media sub-stream to include additional content, wherein annotating the text comprises:
        determining one or more keywords of the text;
        selecting, based on the one or more keywords, one or more advertisements or a link; and
        updating the transcription with the one or more advertisements or the link in association with at least a portion of the text.

2. The method of claim 1, wherein the one or more advertisements are provided within the text.

3. The method of claim 1, wherein the one or more advertisements are provided at least one of in a border and next to a field containing the text.

4. The method of claim 1, wherein:
    annotating the text for the audio component of each respective media sub-stream to include additional content further comprises determining that the one or more keywords include a street address of a property; and
    the link is a map to the street address of the property included in the one or more keywords.

5. The method of claim 1, wherein:
    determining the one or more keywords of the text includes determining that the one or more keywords include a phone number; and
    the link is for dialing the phone number.

6. The method of claim 1, wherein determining the one or more keywords of the text is based on at least one of a context of the text and a frequency with which at least one of a word and a phrase is used in the text.

7. The method of claim 1, wherein:
    the communication session is a real-time communication session; and
    the text and one or more advertisements in association with the text is provided during the real-time communication session.

8. A server device operable to transcribe speech in a communication session comprising:
    a memory; and
    one or more processors coupled to the memory and operable to execute instructions stored in the memory, the one or more processors configured to:
        transmit a virtual communication session in substantially real-time to the plurality of end user devices;
        receive a media stream associated with a plurality of end user devices, wherein the media stream comprises a video component and an audio component;
        separate the audio component from the video component;

transcribe at least a portion of speech from the audio component to text;
provide a transcription in substantially real-time; and
annotate the text for the audio component to include additional content by:
determining one or more keywords of the text;
searching for one or more of an image, a video, music, and an article that correspond to the one or more keywords of the text;
selecting, based on the one or more keywords, one or more advertisements or a link that correspond to the one or more of the image, the video, the music, and the article; and
updating the transcription with the one or more advertisements or the link in association with at least a portion of the text to a user.

9. The server device of claim 8, wherein the one or more advertisements are provided at least one of in a border and next to a field containing the text.

10. The server device of claim 8, wherein annotating the text for the audio component to include additional content further comprises:
selecting, based on the one or more keywords, one or more hyperlinks; and
inserting at least one of the one or more hyperlinks into the text.

11. The server device of claim 10, wherein the one or more hyperlinks include at least one of a map of an address based on the one or more keywords including the address, an option to dial a phone number based on the one or more keywords including the phone number, an image, a video, music, and an article.

12. The server device of claim 8, wherein determining the one or more keywords of the text is based on at least one of a context of the text and a frequency with which at least one of a word and a phrase is used in the text.

13. The server device of claim 8, wherein:
the communication session is a real-time communication session; and
the text and one or more advertisements in association with the text is provided during the real-time communication session.

14. A non-transitory computer storage medium encoded with a computer program, the computer program comprising instructions that, when executed by one or more processors, cause the one or more processors to perform operations comprising:
transmitting a virtual communication session in substantially real-time to the plurality of end user devices;
receiving, by one or more processors, a combined media stream comprising a plurality of media sub-streams each associated with one of the plurality of end user devices, wherein each of the plurality of media sub-streams in the combined media stream comprises a respective video component and a respective audio component;
for each of the plurality of media sub-streams, separating, by the one or more processors, the respective audio component from the respective video component;
for each separate audio component, transcribing, by the one or more processors, at least a portion of speech from the audio component to text;
providing a transcription in substantially real-time; and
annotating the text for the audio component of each respective media sub-stream to include additional content, wherein annotating the text comprises:
determining one or more keywords of the text;
selecting, based on the one or more keywords, one or more advertisements or a link; and
updating the transcription with the one or more advertisements or the link in association with at least a portion of the text.

15. The computer storage medium of claim 14, wherein the one or more advertisements are provided within the text.

16. The computer storage medium of claim 14, wherein the one or more advertisements are provided at least one of in a border and next to a field containing the text.

17. The computer storage medium of claim 14, wherein annotating the text for the audio component of each respective media sub-stream to include additional content further comprises:
selecting, based on the one or more keywords, one or more hyperlinks; and
inserting at least one of the one or more hyperlinks into the text.

18. The computer storage medium of claim 17, wherein the one or more hyperlinks include at least one of a map of an address based on the one or more keywords including the address, an option to dial a phone number based on the one or more keywords including the phone number, an image, a video, music, and an article.

19. The computer storage medium of claim 14, wherein determining the one or more keywords of the text is based on at least one of a context of the text and a frequency with which at least one of a word and a phrase is used in the text.

* * * * *